Nov. 15, 1966  G. D. PETERSON  3,285,457
TELEVISION PICTURE TUBE ENVELOPES AND METHOD OF
ASSEMBLING THE ENVELOPE PARTS

Filed Feb. 26, 1964  2 Sheets-Sheet 1

INVENTOR.
Gerald D. Peterson
BY
ATTORNEY

INVENTOR.
Gerald D. Peterson
ATTORNEY

United States Patent Office 3,285,457
Patented Nov. 15, 1966

3,285,457
TELEVISION PICTURE TUBE ENVELOPES AND METHOD OF ASSEMBLING THE ENVELOPE PARTS
Gerald D. Peterson, Addison, N.Y., assignor to Corning Glass Works, Corning, N.Y., a corporation of New York
Filed Feb. 26, 1964, Ser. No. 347,467
7 Claims. (Cl. 220—2.1)

This invention relates to the manufacture of television picture tubes. More particularly, the invention relates to the fabrication of rectangular glass color television picture tubes each of which includes a viewing panel portion and a funnel portion which are sealed to each other in the fabrication of a complete tube. Still more specifically, the invention relates to means provided for alignment of the sealing edges of pairs of said tube portions prior to the sealing thereof to each other.

Glass color television picture tubes, during the manufacture thereof, are evacuated and are then processed through an exhaust bake cycle comprising substantial temperature changes made at a relatively rapid rate of speed. In such processing of glass color television picture tubes of the type comprising viewing panel portions and funnel portions, pairs of which are sealed to each other to form tube envelopes, among the difficulties encountered are that leaks sometimes occur in the seals between such portions due to the relatively extreme rates of said exhaust bake cycle and, in addition, that the tubes may be relatively weak at the lines of said seals due to the extreme rates of such cycle. Accordingly, in order to attain the best seals possible between said tube portions, the sealing edges of each pair of such portions should be optimumly matched or aligned with each other in preparation for the sealing thereof.

In the mass production of glass television picture tubes of the type discussed above, a multiplicity of viewing panel portions and funnel portions are formed and pairs of such portions are thereafter randomly selected for sealing to each other to form the tube envelopes. While said tube portions are formed in accordance with selected norms for each size and shape of tube, as is well known in the glass making art, small dimensional variations between similar portions oftentimes occur in the forming of the portions. In the fabrication of round television picture tubes, such dimensional variations present very little difficulty in the previously discussed alignment or matching of the sealing edges of viewing panel portions and funnel portions for sealing thereof to form tube envelopes. However, in the fabrication of rectangular television picture tubes, the aforementioned dimensional variations present a considerable problem to the attainment of optimum alignment of the sealing edges of the portions used to form the tube envelopes. For obvious economic reasons, viewing panel portions and funnel portions cannot be manually selected for optimum matching with each other, but such portions must be randomly paired as previously mentioned.

It is, therefore, an object of the present invention to provide funnel portions and viewing panel portions for rectangular glass color television picture tubes which have integrally formed therein simplified means by which optimum alignment of the sealing edges of randomly selected pairs of such portions may be attained for the purpose of sealing such edges to each other.

It is another object of the invention to provide a method of optimumly aligning the seal edges of each of a plurality of randomly selected pairs of funnel and viewing panel portions for rectangular glass color television picture tubes prior to the sealing of such portions to form a picture tube envelope.

In accomplishing the above objects of the invention there is integrally incorporated on selected exterior sidewalls of each viewing panel portion and each funnel portion to be employed in the manufacture of rectangular glass color television picture tubes, during the forming of such portions, a V-shaped groove and a protuberance or projection which are subsequently employed as reference points, as hereinafter described, for the purpose of accomplishing the abovementioned necessary alignment of the sealing edges of said portions of the picture tubes.

Other objects and characteristic features of the invention will become apparent as the description proceeds.

In the accompanying drawings.

Similar reference characters refer to similar parts in each of the drawings.

Figure 1:
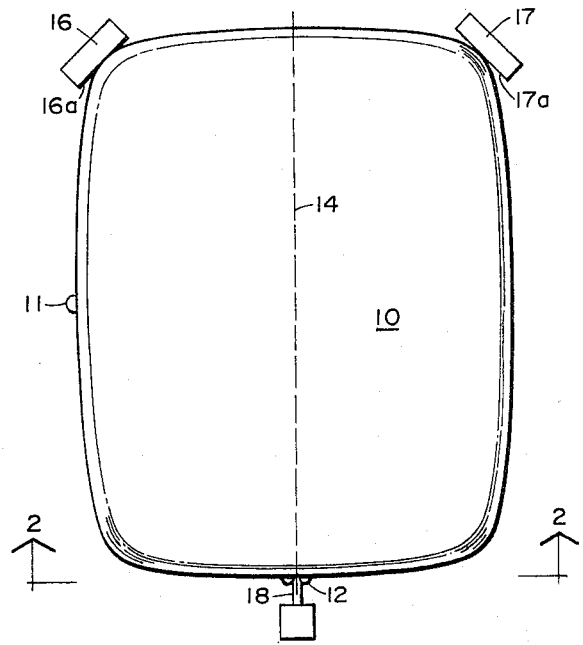
FIG. 1 illustrates a top plan view of a portion of a rectangular television picture tube according to the invention and arranged in a jig, such portion being either a viewing panel portion or a funnel portion and being shown with the entrance to the usual cavity therein downwardly disposed.
Figure 2:
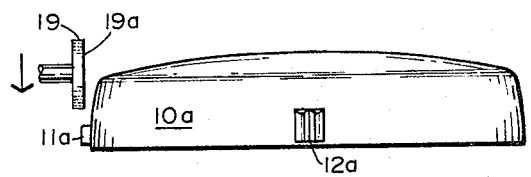
FIG. 2 is an end elevational view of a viewing panel portion of a rectangular television picture tube, such view being taken on the line 2—2 of FIG. 1 and illustrating a step, in accordance with the invention, of grinding a summit on a projection or protuberance provided on the viewing panel portion.
Figure 3:
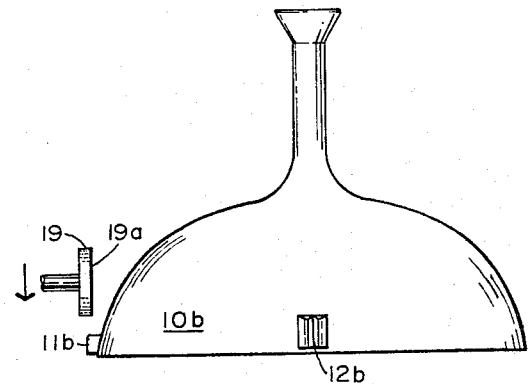
FIG. 3 is an end elevational view of a funnel portion of a rectangular television picture tube, such view being similar to FIG. 2 and also being taken on line 2—2 of FIG. 1.

Referring to FIG. 1, there is illustrated one of said tube portions indicated by the reference character 10 and having provided at the center of one longitudinal sidewall thereof a projection or protuberance 11, such projection being adjacent the sealing edge of such portion as illustrated in FIGS. 2 and 3. There is also provided on an end sidewall of said tube portion, adjacent the sealing edge thereof, a V-shaped groove 12 having a vertex which coincides with a centerline extending through the centers of the end sidewalls of the tube portion and indicated at 14. It will be understood that each of the viewing panel portions and the funnel portions of the television picture tubes, to which the method of the present invention is to be applied, is similarly provided with a projection and a V groove, such elements being incorporated as integral parts of the respective portions during the forming of such portions.

Referring further to FIG. 1 there is shown first and second guide blocks designated by the reference characters 16 and 17, respectively, and having plane or flat faces designated 16a and 17a, respectively, such blocks being arranged so that the faces of the blocks are disposed in a predetermined angular relationship with each other, as discussed below.

A first line is chosen which may, for the purposes of this description, be considered to coincide with the line shown at 14 in FIG. 1. The guide blocks 16 and 17 are so arranged in relationship with such first line that a line projected from one such block in the same plane as the face of the respective block and toward the first line will intersect it at the same point and at the same angle as a line similarly projected from the face of the other of the guide blocks. By such arrangement of the blocks, such first line will bisect into two equal parts any line projected normal to the first line and extending between the faces of blocks.

A positioning device such as a pointed finger indicated at 18 is located so that its pointed end coincides with the line indicated at 14 (FIG. 1). Such finger and said guide blocks form a jig in which each television picture tube viewing panel portion and funnel portion may be arranged, as illustrated in FIG. 1, with the pointed end of said positioning device extending into the vertex of the previously mentioned groove provided on one of the end sidewalls of the respective tube portion and with the corners adjacent the other end sidewall of such tube portion each disposed against the face of a different one of said guide blocks. Such arrangement is readily apparent from a brief glance at FIG. 1 of the drawings and it will be readily understood that each of the previously mentioned tube portions may be so arranged in such a jig and will be positioned identically to that of every other tube portion so arranged, that is, with the centerline extending through the centers of the end sidewalls of the respective tube portion coinciding with the line indicated at 14.

There is shown in FIG. 2 of the drawings a television picture tube viewing panel portion 10a provided with projection or protuberance and V groove as previously mentioned. Such projection and V groove are designated 11a and 12a, respectively. The tube portion is positioned in a jig in the manner illustrated in FIG. 1 and then a summit is ground on the projection 11a by a grinding wheel such as indicated at 19, the face 19a of such grinding wheel being disposed a fixed predetermined distance from the centerline of said panel portion, such distance being selected in accordance with a selected norm for the television picture tube and said summit being ground by a downward movement of the grinding wheel as indicated by the arrow in FIG. 2.

In FIG. 3 of the drawings there is shown a television picture tube funnel portion also having a projection or protuberance and a V groove as previously mentioned, such projection and V groove being designated 11b and 12b, respectively. This funnel portion is also positioned in a jig in the manner illustrated in FIG. 1 and a grinding wheel, such as 19, is employed in a manner identical to that discussed above, for grinding a summit on the projection 11b.

While one arrangement of a jig for precisely positioning the viewing panel portions and the funnel portions for grinding the summits on the projections thereof is illustrated in FIG. 1, other devices for so positioning said portions by employing the V groove provided on each respective portion will be readily apparent, and it is not intended that the method of applicant's invention be confined to the use of the jig illustrated, but such jig is shown merely as one example of the manner in which said tube portions may be identically positioned for precision grinding of the projections on such portions.

Figure 4:
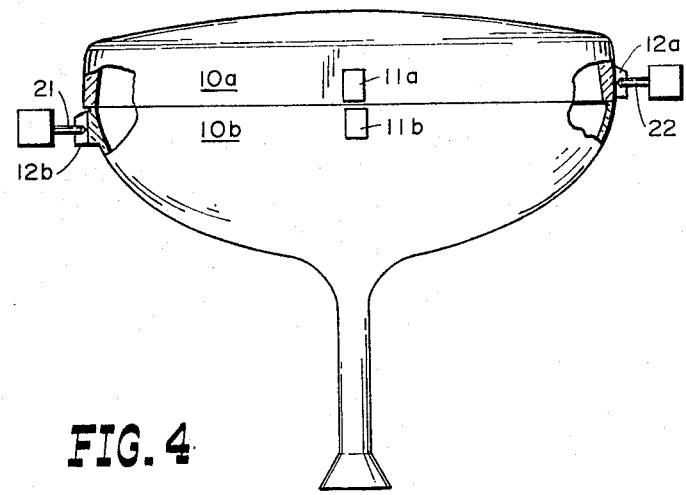
FIG. 4 illustrates the step, according to the invention, of positioning the sealing edges of a pair of randomly selected picture tube viewing panel and funnel portions with respect to each other for sealing thereof, such portions being partially illustrated in cross section.

FIG. 4 illustrates the step of positioning a viewing panel portion and a funnel portion in relationship with each other so that the sealing edges of said portions abut and are optimumly aligned for sealing thereof to form a picture tube envelope, such sealing being effected, in the manner well known in the art, by applying a sealing compound such as a solder glass to the edges of the tube portions, and then subjecting the tube envelope to a heating cycle to fuse and unite said portions. It will be understood that the present invention does not include the sealing step itself since such step is, as stated, old and well known, but the invention includes the step of optimumly aligning the sealing edges with each other for sealing thereof.

Referring further to FIG. 4, there is illustrated a pair of pointed and oppositely disposed fingers 21 and 22, the pointed ends of which are arranged in the same vertical plane and are pointed toward each other. The ends of said fingers are precisely horizontally separated by a predetermined distance, such distance being determine in accordance with the norm for the tube envelope to fabricated, as discussed below.

For purposes of example only, it will be assumed th the viewing panel portion of a glass rectangular pictu tube envelope, ideally formed in accordance with a pr determined norm, has a longitudinal dimension betwe the centers of its end sidewalls at the outside margi of its sealing edge of 21.136 inches. The funnel portic for sealing to such a viewing panel portion, and ideal formed in accordance with said predetermined norm, h a similar longitudinal dimension of 21.011 inches. Tl sealing edges of the viewing panel and funnel portio have a width of .325 inch and .200 inch respectivel It is apparent, therefore, that the difference of .125 inc between said longitudinal dimensions of said portions incorporated in the greater width of sealing edge of th viewing panel portion.

It has been found that said tube portions may, in th forming thereof, be provided with longitudinal dimer sional deviations from said predetermined norm of up t .0625 inch for a possible total dimensional variation be tween two viewing panel portions or between two fun nel portions of .125 inch, and between a viewing pane portion and a funnel portion of .250 inch. That is, sai longitudinal dimensions of a plurality of viewing panel may, from panel to panel, vary between minimum an maximum dimensions of 21.0735 inches and 21.198 inches, respectively. Similarly, said longitudinal dimen sions of a plurality of funnel portions may, from funne to funnel, vary between a minimum dimension of 20.948 inches and a maximum dimension of 21.0735 inches Therefore, the longitudinal dimensional variation be tween a viewing panel portion and a funnel portion ma be as large as .250 inch.

Referring again to FIG. 4, for television picture tubes whose parts are formed in accordance with the prede termined norm discussed above the pointed ends of fin gers 21 and 22 would be disposed a distance horizontally 21.065 inches apart. A funnel portion is randomly se lected from a plurality of such portions and is arranged, as shown in FIG. 4, with the vertex of its groove 12b resting against the pointed end of finger 21. A viewing panel portion is then randomly selected from a plurality of such portions and its sealing edge is positioned in respect to the sealing edge of the funnel portion as shown in FIG. 4 and with the vertex of its groove 12a resting against the end of finger 22. Such tube portions are also disposed in respect to each other so that the planes of the summits ground on the projections 11a and 11b vertically coincide, such planes being positioned, from a line extending between the ends of said fingers, a distance corresponding to the distance selected for the grinding of the summits. If both members of the pair of portions so selected were ideally formed in accordance with said predetermined norm, the viewing panel portion sealing edge adjacent both of the V grooves 12a and 12b would equally overhang the margins of the funnel portion sealing edge adjacent such points. That is, the sealing edge of the viewing panel would, adjacent groove 12a, overhang both the inner and outer margins of the sealing edge of the funnel portion a distance of .0625 inch, and an identical overhang would occur adjacent groove 12b. Thus an ideal alignment of the sealing edges adjacent the the end sidewalls of such ideal tube portions would be provided.

The tube portions shown in FIG. 4 in sealing relationship with each other, are illustrated as dimensionally deviating from dimensions selected in accordance with a predetermined norm. Employing the previously discussed example of dimensions for the tube portions, the portions shown in FIG. 4 are considered to have the previously mentioned maximum longitudinal dimensions. That is, the longitudinal dimension of the viewing panel is assumed to be 21.1985 inches and the longitudinal dimension of the funnel is assumed to be 21.0735 inches. If, then, the ends of fingers 21 and 22 are, as previously discussed, disposed a distance horizontally 21.065 inches apart, the sealing edges of the tube portions would abut as illustrated in FIG. 4. That is, the outer margins of the sealing edges adjacent groove 12a would coincide, while the inner margin of the sealing edge of the viewing panel adjacent such point would overhang the inner margin of the funnel by a distance of .125 inch. Similarly, adjacent groove 12b, the outer margin of the sealing edge of the viewing panel would overhang the outer margin of the sealing edge of the funnel by a distance of .125 inch while the inner margins of such sealing edges would coincide. It is apparent that, although the maximum overhangs of .125 inch occur under such conditions, all of the funnel sealing edge adjacent the V grooves 12a and 12b meets with a part of the sealing edge of the viewing panel and, therefore, such parts are positioned in relationship with each other to provide optimum sealing thereof.

The example, discussed above and illustrated in FIG. 4, of tube portions which deviate in a maximum manner from dimensions determined in accordance with a predetermined norm for a television picture tube fabricated from a pair of such portions is set forth as an extreme case of such deviations. In actuality such extreme dimensioned deviations seldom occur. However, from a brief study of the positioning step discussed above, it will be apparent that the method of the present invention will provide for optimum alignment of the sealing edges of each pair of glass rectangular television picture tube viewing panel and funnel portions, such paired portions being randomly selected from a plurality of such portions formed in accordance with a predetermined norm and possibly dimensionally deviating from such norm to a determined maximum degree.

Although there is herein set forth one specific dimensional example of television picture tube envelope portions to which the method of the invention may be applied, it is not intended that the invention be confined to the specific example described, but rather that the subject matter desired to be secured be limited only by the spirit and scope of the appended claims.

I claim:
1. The method of aligning the sealing edges of a plurality of randomly selected pairs of viewing panel portions and funnel portions of rectangular glass television picture tubes in preparation for sealing the portions of each such pair to each other in the fabrication of such tubes, one or both of such portions of any of said pairs possibly deviating dimensionally from a preselected norm; said method comprising; providing a groove adjacent the sealing edge and on a corresponding sidewall of each of said portions, each such groove having a vertex coinciding with a centerline extending through the center of the sidewall on which the groove is provided and the center of the opposite sidewall; providing a summit adjacent the sealing edge and at the center of another sidewall of each of said portions, each such other sidewall being adjacent to the sidewall on which each respective groove is provided and each such summit being located from said centerline of its respective portion a distance determined in accordance with said preselected norm; positioning the sealing edges of each of said pairs in facing relationship, and thereafter optimumly aligning such edges of each respective pair by positioning said vertexes and summits provided on the portions of each such pair in relationship with each other in accordance with said preselected norm.

2. In the fabrication of rectangular glass television picture tubes, the method of optimumly aligning, in accordance with a predetermined norm, the sealing edge of the viewing panel portion with the sealing edge of the funnel portion of each such tube for sealing thereof; such method comprising, providing a projection adjacent the sealing edge and on a first corresponding sidewall of each of said portions; grinding a summit on each said projection, each such summit being a selected distance from a centerline extending through the centers of the adjacent sidewalls of the respective portion, such selected distance being preselected in accordance with said predetermined norm; providing a groove adjacent the sealing edges and on selected ones of said adjacent sidewalls of each of said portions, such sidewall of a panel portion being so selected as to be oppositely disposed to such sidewall of a funnel portion when said sealing edges of a pair of such portions are positioning in abutting relationship with each other for sealing thereof, and each such groove having a vertex through which said centerline of the respective portion extends; randomly selecting pairs of said portions, positioning the sealing edges of each selected pair in said abutting relationship; and thereafter aligning said edges to attain said optimum matching by positioning said summits of each such selected pair with respect to each other so that said centerlines coincide, and by positioning said vertexes of each such selected pair against first and second oppositely disposed fingers separated from each other by a distance selected in accordance with said predetermined norm.

3. The method of aligning with reference to each other the seal edges adjacent the perimeters of the viewing panel part and the funnel port of a rectangular glass television picture tube, which comprises; providing a V-shaped groove adjacent the seal edge and on a sidewall of one of said parts and a similar groove on a corresponding sidewall of the other of said parts, the vertex of each such groove coinciding with a centerline through the center of the sidewall on which the respective groove is provided and the center of the opposite sidewall; providing a protuberance adjacent the seal edge and at the center of another sidewall of each of said parts, each such other sidewall being correspondingly adjacent to the sidewall on which each respective groove is provided; grinding each of said projections to provide a summit thereon a predetermined distance from said centerline of the respectively associated part, positioning said parts with said seal edges abutting each other in substantially matching relationship; and thereafter further positioning said parts for optimum alignment of said seal edges for sealing thereof to each other, such further positioning being attained by positioning the vertex of each of said grooves against the pointed end of a different one of a pair of oppositely disposed fingers, such ends being separated by a predetermined distance, and by positioning each of said summits against a reference point separated from a centerline extending between said ends of said fingers by the respective first mentioned predetermined distance.

4. The method of aligning with respect to each other the sealing edges of the viewing panel portion and the funnel portion of a rectangular glass television picture tube in preparation for sealing such portions to each other to form a tube envelope, which comprises; providing a V-shaped groove adjacent the sealing edge and on a sidewall of one of said positions and a similar groove on a corresponding sidewall of the other of said portions, the vertex of each groove coinciding with a centerline through the centers of the sidewall on which the respective groove is provided and the opposite sidewall; providing a projection adjacent the sealing edge and at the center of another sidewall of each of said portions, each such other sidewall being correspondingly adjacent to the sidewall on which each respective groove is provided; grinding each of said projections to provide a summit thereon a predetermined distance from said centerline of the respectively associated portion, positioning said portions with said sealing edges in sealing relationship with each other, and thereafter further positioning said portions by means of the summits of said projections and by means of the vertexes of said grooves so that said centerlines coincide with each other and so that variations from ideal dimensions for the diameters of said portions along said centerline are optimumly compensated for in alignment of said edges for the sealing thereof to form said tube envelope.

5. As an article of manufacture, a rectangular viewing panel intended to be used in the fabrication of a glass television picture tube and having a sealing edge for sealing the panel to a corresponding sealing edge on the funnel portion of such a tube; said panel having a V groove on one sidewall thereof and adjacent said sealing edge, the vertex of such groove coinciding with a centerline extending through the center of such sidewall and the center of the opposite sidewall; said panel also having a projection thereon at the center of another sidewall and adjacent said sealing edge, such other sidewall being adjacent said one sidewall and such projection having a summit precisely ground thereon a predetermined distance from said centerline; said summit of said projection and said vertex of said groove being provided for optimumly aligning the sealing edge of such panel with the sealing edge of a television picture tube funnel portion prior to the sealing thereof, such funnel portion being similarly provided with a similar projection and groove.

6. As an article of manufacture, a rectangular funnel portion for a glass television picture tube, such portion intended to be used in the fabrication of such a tube and having a sealing edge for sealing such portion to a corresponding sealing edge on a viewing panel for such a tube; said funnel portion having a V groove on one sidewall thereof and adjacent said sealing edge, the vertex of such groove coinciding with a centerline extending through the center of such sidewall and the center of the opposite sidewall; said funnel portion also having a projection thereon at the center of another sidewall and adjacent said sealing edge, such other sidewall being adjacent said one sidewall and such projection having a summit precisely ground thereon a predetermined distance from said centerline; said summit of said projection and said vertex of said grove being provided for optimumly aligning the sealing edge of such funnel portion with the sealing edge of a television picture tube viewing panel prior to the sealing thereof, such viewing panel being similarly provided with a similar projection and groove.

7. As an article of manufacture, a rectangular television picture tube comprising a viewing panel portion having a sealing edge which is sealed to a corresponding similar edge of a funnel portion; said panel portion including a V-shaped groove on one sidewall thereof and adjacent said sealing edge, the vertex of such groove coinciding with a centerline extending through the center of such sidewall and the sidewall opposite thereto; said funnel portion similarly including such a V-shaped groove on its sidewall opposite said one sidewall of the panel portion; said panel portion also including a projection adjacent said sealing edge and at the center of another of its sidewalls adjacent said one sidewall, such projection having a summit ground thereon a distance from said centerline determined in accordance with a selected norm for said picture tube; said funnel portion also similarly including such a projection on its sidewall adjacent said other sidewall of said panel portion; said sealing edges of said panel and funnel portions being optimumly aligned with each other prior to sealing thereof by selectively positioning said summits relative to each other and by positioning the vertex of each of said grooves against the ends of opposite ones of oppositely disposed fingers such ends being pointed toward each other and separated by a distance determined in accordance with said selected norm.

References Cited by the Examiner
UNITED STATES PATENTS

| | | | |
|---|---|---|---|
| 2,514,878 | 7/1950 | Kuperus | 220—2.1 X |
| 2,920,682 | 1/1960 | Linberg | 156—283 X |
| 3,043,147 | 7/1962 | Will | 156—64 X |

THERON E. CONDON, *Primary Examiner.*

MARTHA L. RICE, *Examiner.*